United States Patent [19]

Tenney, Jr.

[11] 4,377,948
[45] Mar. 29, 1983

[54] DIFFERENTIAL GAS PRICING APPARATUS AND METHOD

[76] Inventor: Charles M. Tenney, Jr., 32 Harrison St., Duxbury, Mass. 02332

[21] Appl. No.: 273,322

[22] Filed: Jun. 15, 1981

Related U.S. Application Data

[63] Continuation of Ser. No. 962,082, Nov. 20, 1978, abandoned.

[51] Int. Cl.³ ...................... G01F 15/02; G01F 15/06; G06M 3/08
[52] U.S. Cl. .............................. 73/861.03; 73/432 A; 364/557; 374/109; 377/21
[58] Field of Search ................ 73/861.02, 861.03, 198, 73/199; 165/11 R; 235/92 FL, 92 AC, 92 MT; 364/464, 510, 465, 557, 509; 236/94

[56] References Cited

U.S. PATENT DOCUMENTS

| | | | |
|---|---|---|---|
| 1,278,077 | 9/1918 | Reeve | 73/233 X |
| 2,942,497 | 6/1960 | Berck | 73/233 X |
| 3,176,514 | 4/1965 | Foster | 73/233 X |
| 3,201,573 | 8/1965 | Roth | 73/343.5 X |
| 3,221,926 | 12/1965 | Winiger | 235/92 AC |
| 3,230,767 | 1/1966 | Heigl et al. | 73/198 |
| 3,243,581 | 3/1966 | Winiger | 235/92 AC |
| 3,326,045 | 6/1967 | Vrsaljko | 73/339 C |
| 3,588,481 | 6/1971 | Stroman | 73/195 |
| 3,653,261 | 4/1972 | Feldman | 73/198 X |
| 3,675,480 | 7/1972 | Feldman | 73/199 X |
| 3,688,573 | 9/1972 | Garrett | 73/861.03 |
| 3,739,159 | 6/1973 | Nalley | 73/195 X |
| 3,803,912 | 4/1974 | Ohno | 73/195 |
| 3,808,407 | 4/1974 | Ratz | 235/9 FQ |
| 3,831,011 | 8/1974 | Hulme | 73/194 E |
| 3,905,229 | 9/1975 | Togo et al. | 73/861.03 |
| 3,932,730 | 1/1976 | Ambrosio | 364/464 X |
| 3,940,595 | 2/1976 | Turner | 235/92 MT |
| 3,978,727 | 9/1976 | Griverus | 73/194 E |
| 4,010,645 | 3/1977 | Herzl | 73/861.03 |
| 4,038,534 | 7/1977 | Mirdadian | 235/92 MT X |
| 4,154,102 | 5/1979 | Warrick et al. | 73/233 |
| 4,168,624 | 9/1979 | Pichon | 73/195 |
| 4,184,364 | 1/1980 | Du Bae | 73/195 |

OTHER PUBLICATIONS

*Technology Review*—Publication—on "Electric Power Fluctuations", p. 41, Feb., 1948.
Publication—"Gen-a-Reader ®", Generator Remote Meter Reading Register", Hersey Products Inc. (2 pp.) 1973.
Publication—Singer American Meter Division Bulletin 250.1 (4 pp.), "Remote Gas Meter Reading System".

*Primary Examiner*—Daniel M. Yasich
*Attorney, Agent, or Firm*—Kenway & Jenney

[57] ABSTRACT

A method and apparatus for reducing the peak loading requirements of a gas utility allow the use of a unit rate structure which depends upon the ambient outside temperature. The apparatus employs an ambient temperature measuring device and a recording element responsive thereto for providing an output reading of gas consumption which takes into account the outside ambient temperature. Thereby, a differential rate structure dependent upon the measured ambient outside temperature can be implemented. In one embodiment, the recording element has a meter which provides an actuating signal for each occurrence of a measured volumetric consumption of gas. The actuating signal is directed to one of a plurality of counters depending upon the measured outside ambient temperature. The utility then uses a different rate for each of the several counters.

10 Claims, 3 Drawing Figures

DIFFERENTIAL GAS PRICING APPARATUS AND METHOD

This is a continuation, of application Ser. No. 962,082, filed Nov. 20, 1978, now abandoned.

BACKGROUND OF THE INVENTION

The invention relates generally to the utility industry and in particular to an apparatus and method for reducing peak loading requirements for a gas utility.

It is well documented for electric utilities that there are peaks in electric power consumption. These peaks generally occur from morning until evening on weekdays, and the cost to the electric utility industry to provide the generating equipment to meet these peak loads is enormous. As a result, many utilities have sought, and in some cases have implemented, variable load pricing wherein the rate structure prices electricity used at different times of the day differently. Thus, electricity used during the peak load hours costs substantially more than, for example, electricity used at night where the load requirement is far below peak.

This rate structure is attractive for the electric utility companies because the cost of generating the incremental power to meet "peak loading requirements" is very expensive. Thus, by diverting energy usage from peak load to shoulder or off-peak times through the differential pricing structure, the electric utilities expect to save significantly by reducing both capital outlay for new plant and equipment, and the ongoing incremental costs of producing the "peak load" electricity.

In addition to the cost savings which are available to a customer by judicious use of electrical appliances, reduced fuel consumption should also be realized by the utility, for example, by using higher efficiency equipment for meeting more of the now shifted electrical load. Also in applications such as electric heat, a differential pricing structure can result in a major fuel savings by inducing customers to reduce the temperature at which a residence or building is maintained, at least during the peak loading periods. Thus a differential pricing policy has major advantages in this time of energy conservation, to inter alia, reduce our dependency upon imported foreign oil and to preserve our present domestic energy supplies.

A similar peak loading situation is well known to the gas utility industry. The gas utility, which contracts for its gas requirements prior to the peak usage season (winter), is supply limited because of the fixed maximum quantity of pipelined gas which can be forced through the available pipeline network. When gas consumption exceeds this "base" level, the gas utility must supplement its relatively cheap "contract gas" with relatively expensive "stored gas", for example, LNG or propane. In this manner the peak loading requirements are met.

Since pipeline or contract gas cannot be readily stored, a peak load substantially always requires that LNG or another available stored gas be used. There has therefore been a need in the gas industry to provide the motivation to encourage gas users to refrain from using gas during the peak times.

Unlike the electric utility industry, however, the peak load times for the gas industry do not occur at the same time each weekday but are seasonal, occurring solely in winter when the residential and commercial use of gas for heating purposes (primarily the residential use) adds to the constant underlying or base commercial and residential use, for example, for hot water. Therefore peak loading times occur substantially solely as a result of increased residential use during those times when the ambient outdoor air temperature is low. For example, the peak usage may start when the outside ambient temperature is about 32° F. Thus, above this threshold temperature, the stored gas supply need not be tapped; whereas below the threshold temperature stored gas supply must be used, thereby significantly increasing the incremental costs to the gas utility. At present, the incremental cost is passed uniformly to all users of natural gas irrespective of the energy saving character of their consumption because there has not, prior to the present invention, been a satisfactory method and apparatus for applying variable rate pricing to gas consumption.

The principle object of this invention is therefore a method and apparatus for urging gas utility customers to refrain from using gas during the peak loading times. Other objects of the invention are a method and apparatus for providing equitable distribution of gas energy costs, for providing a system for incrementally increasing the cost of gas to the major users during peak loading, and for rewarding the frugal user during peak loading. A further object of the invention is an apparatus which is simple to use, which is reliable, which is flexible for use with a multi-level gas pricing system, and which can be employed with existing gas consumption measuring apparatus at minimum costs.

SUMMARY OF THE INVENTION

The invention relates to an apparatus and method for recording the consumption of gas supplied by a utility company. The gas consumption measuring apparatus features an ambient temperature measuring element, and a recording element for providing an output indication responsive to the temperature element. Thereby, a differential rate structure dependent upon the measured ambient outside air temperature can be implemented.

In one particular aspect of the invention, the recording element features means responsive to a measured unit of volumetric gas flow for providing an actuating signal and means responsive to the temperature measuring element for selectively incrementing at least one counter device at each occurrence of the actuating signal.

In another particular aspect, there are featured means responsive to the actuating signal and the temperature measuring element for incrementing a counter device a selected number of increments, the number of increments depending upon the measured temperature.

In yet another particular aspect of the invention, the counter devices are positioned remote from the gas volume measuring element. A temperature responsive counter selection element is connected to the gas measuring element for directing each actuating signal, which may be an electrical signal pulse, to one of the counters. The selected counter is chosen in response to the measured temperature.

The method of the invention for allocating the costs of supplying gas from a utility to a gas user to encourage lower gas consumption during the peak use periods features the steps of measuring gas consumption as a function of ambient outside air temperature and charging incrementally more for gas used at a lower temperature than for gas used at a higher temperature.

In a particular aspect of the method, there are further featured the steps of generating an electrical pulse or actuating signal corresponding to each use of a measured volume of gas, measuring the ambient outside air temperature, and directing each pulse or actuating signal to one of a plurality of counting elements, the selected counting element being dependent upon the measured temperature. The counting elements may be located remote from the location at which the electrical pulse or actuating signal is generated and an equivalent meter use value can be generated to the remote location. Alternatively, the pulse or actuating signal can be employed to increment a single counting element a number of times corresponding to the measured ambient temperature.

DESCRIPTION OF THE DRAWINGS

Other objects, features, and advantages of the invention will appear from the following description of particular embodiments of the invention taken together with the drawings in which.

DESCRIPTION OF PARTICULAR PREFERRED EMBODIMENTS

Figure 1:
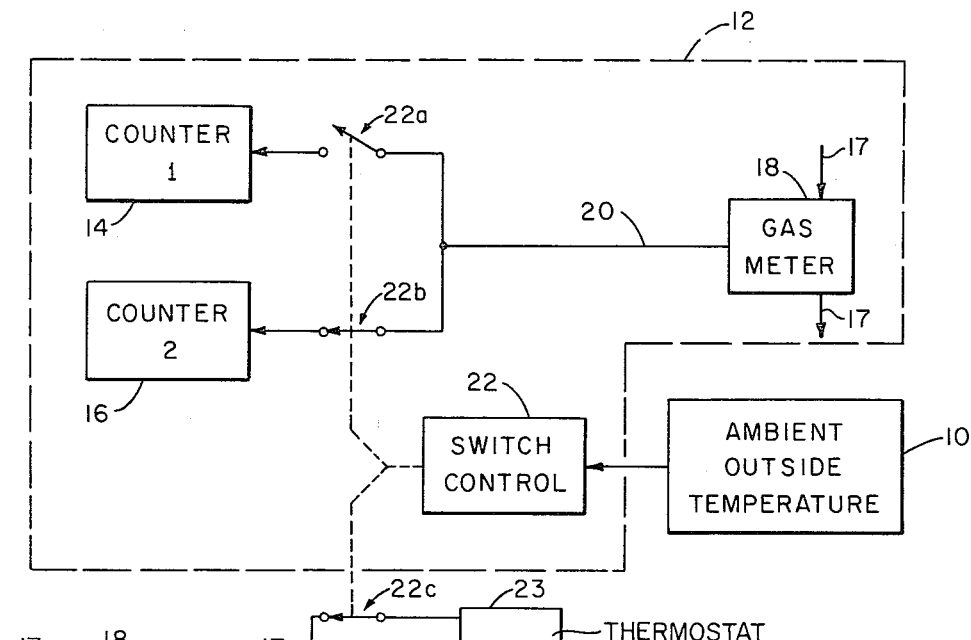
FIG. 1 is an electrical block diagram of a first particular embodiment of the invention.

Referring to FIG. 1, in one particular embodiment of the invention, a gas consumption measuring apparatus has an ambient temperature measuring device 10 which controls operation of a recording system 12. The recording system 12 provides output indications over counting elements 14 and 16, for example, pulse actuated counters, which enable a differential rate structure, dependent upon the measured ambient outside air temperature, to be implemented.

The recording system has a gas meter 18 for measuring the volumetric flow of gas 17. Gas meter 18 may be for example a Singer American Meter "Speedreader" pulse/generator unit employed in connection with a standard Singer American gas meter. The "Speedreader" pulse/generator unit provides an induced electric pulse output over a line 20 each time a predetermined volumetric flow, for example 100 cubic feet, has been measured by the meter. The pulse output of the gas meter 18, in the illustrated embodiment, increments one of the plurality of counters 14, 16. While two counters are shown in the illustrated embodiment, other embodiments of the invention can employ a greater number of counters as would be well within the skill of the art.

The counter which is incremented depends upon the setting of a controlled switch, for example a conventionally available relay 22 whose state is responsive to the output of the ambient temperature measuring device 10. Thus, for example, if the temperature is above a set threshold, for example 20° F., counter 14 is incremented through contacts 22a; and if the temperature is below the threshold, counter 16 is incremented through contacts 22b of switch control 22.

The ambient outside temperature device 10 can be any of the temperature responsive elements commercially available, and a particularly advantageous unit is a commercially available thermostat which provides on/off control depending upon the temperature to which the unit is set. A typical thermostat is the Honeywell Model Number T675A. Thus, temperature element 10 may have either a fixed or a variable threshold, and in a more complex embodiment of the invention wherein more than two counting elements are employed, the temperature measuring element will have two or more fixed (or variable) thresholds. Preferably, element 10 will be positioned on other than the south side of the building.

When two or more counting elements are employed, the usage indicated by each counter will be assessed according to a corresponding rate table. Thus, in the illustrated embodiment, wherein counter 16 represents consumption at lower ambient temperatures and counter 14 represents the consumption at higher ambient temperatures, the cost per unit of use recorded by counter 16 will be higher than the cost per unit of use recorded by counter 14. Thus, the apparatus of FIG. 1 provides, when the rate table is correctly prepared, a method of urging the consumer to reduce gas consumption when the temperature drops below a predetermined threshold value.

FIG. 1 further illustrates an automatic control system wherein switch control element 22 has a third set of contacts 22c for automatically setting back a building thermostat 23 when the outside temperature decreases below a set threshold. This construction automatically implements energy savings to take advantage of the differential pricing structure.

Implicit in the description of the FIG. 1 embodiment is the understanding that illustrated meter 18 is positioned inside the building while counter elements 14 and 16 are positioned outside the building for easy access by a meter reader. Since the gas meter provides a cumulative total of gas consumption itself, the meter 18 can be positioned on the outside of the building and one of counters 14, 16 would not be needed. In this embodiment, the meter 18 and either counter 14 or counter 16 would provide all of the required billing information originally provided by counters 14 and 16 together.

Figure 2:
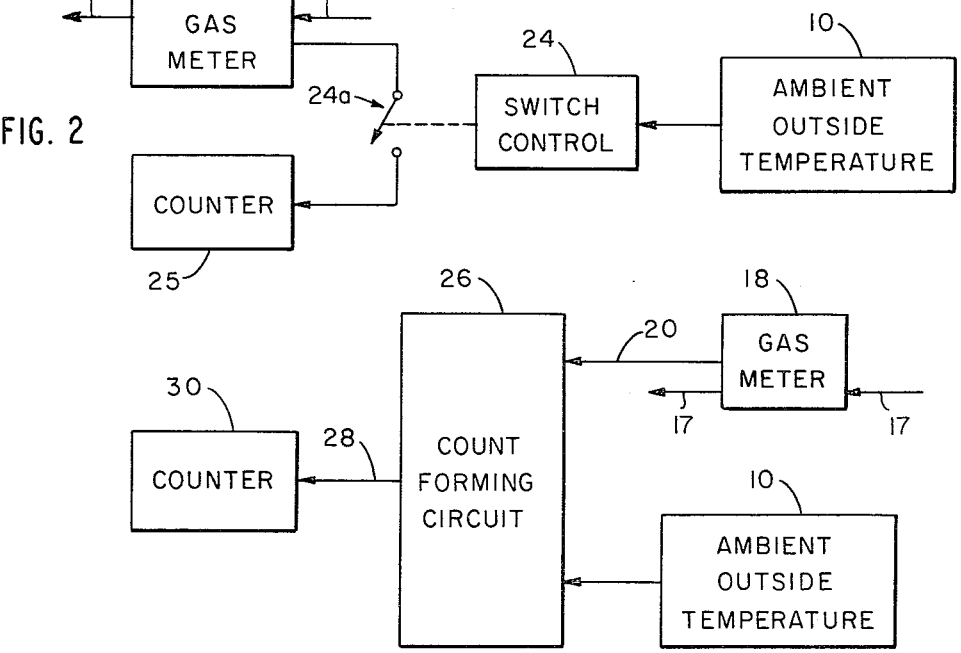
FIG. 2 is an electrical block diagram of a second particular embodiment of the invention.

Thus, referring to FIG. 2, a switch control 24 controls one relay contact 24a in response to the ambient outside temperature device 10. Relay contact 24a corresponds to relay contacts 22a, 22b; and when closed, contacts 24a allow an actuating pulse to pass from gas meter 18 to a counter element 25 (corresponding to one of counter elements 14, 16). Both gas meter 18 and counter element 25 are here located outside the building for easy access by the meter reader.

In operation therefore, gas meter 18 provides a cumulative reading of the total number of units of gas consumed. In addition, when contacts 24a are closed, for example when the outside temperature is below a threshold temperature such as 20° F., counter 25 will also register each unit of consumption. Thus the reading of counter 25 corresponds to the meter reading of counter 16; and the difference of the readings of meter 18 and counter 25 corresponds to the reading of meter 14 (FIG. 1). Thus, by placing meter 18 on the outside of the building, one of the remote counters, 14 and 16 in FIG. 1, can be eliminated.

Figure 3:
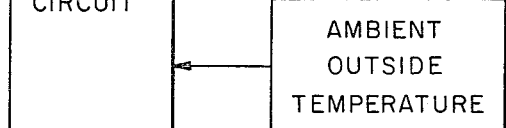
FIG. 3 is an electrical block diagram of a third particular embodiment of the invention.

Referring now to FIG. 3, in a third particular embodiment of the invention, the gas meter 18 and the ambient outside temperature measuring element 10 are connected to a count forming electrical circuit 26 which provides over an output line 28, a plurality of pulses dependent upon (a) the gas consumption indicated by meter 18 and (b) the ambient outside air temperature measured by element 10. The construction of circuit 26 from off-the-shelf, commercially available components would be a matter of ordinary skill to one practiced in the art. Thus, for example, when the temperature is above a set threshold value, say 20° F., for each electrical or actuating pulse provided by gas meter 18 over line 20, illustrated circuit 26 can provide ten pulses to a counter 30; and when the temperature drops below the threshold value, the count forming electrical circuit 26 can provide fifteen pulses over line 28 to counter 30. In this manner the rate structure is automatically built into the counting circuitry so that the accumulated counter output 30 alone determines the utility charges.

Any of the embodiments shown in FIGS. 1, 2, or 3 can employ remote operation wherein counting elements 14, 16, 25, or 30 are connected at or to a remote reading location such as a central computer for central billing, thereby eliminating the need for individual meter reading. (With respect to the FIG. 2 embodiment, a counter corresponding to the gas meter cumulative count would also be required at the remote location.) Alternatively, the output of gas meter 18 can be provided directly to a central location at which a temperature measuring element provides the necessary additional input to determine the rate charges. There can thus be generated at the remote location what can be designated "an equivalent meter use value" which corresponds to the actual usage modified by the measured ambient temperature.

Other embodiments of the invention, including additions, subtractions, deletions, and other modifications of the described particular embodiments will be obvious to those skilled in the art and are within the scope of the following claims.

What is claimed is:

1. A gas consumption measuring apparatus for recording the consumption of gas supplied by a utility comprising:
    an ambient outside temperature measuring means for providing an ambient temperature indicating output signal depending upon the measured ambient outside temperature,
    a gas volume measuring means for providing a discrete gas volume measure indicating actuating signal depending upon a measured flow of gas supplied by said utility, and
    a recording means for providing an output indication responsive to said temperature means and said gas volume measuring means signals, said recording means being responsive to said temperature means and for selectively responding to said gas volume measuring means according to at least a first temperature condition and a second temperature condition, said first condition corresponding to an ambient temperature indicating output signal indicating an outside temperature below a predetermined outside temperature level and said second condition corresponding to an ambient temperature indicating output signal indicating an outside temperature above said predetermined level,
    whereby said recording means in response to said first and second conditions enables a differential rate structure dependent upon the measured ambient outside temperature to be implemented for discouraging the consumption of a greater volume of gas usage at ambient temperatures below said predetermined level.

2. The apparatus of claim 1 wherein
    said gas volume measuring means comprises means responsive to a predetermined measured unit of volumetric gas flow for providing said actuating signal, and
    said recording means comprises means responsive to said temperature measuring means output signal for selectively incrementing at least one counter means at each occurrence of said actuating signal.

3. The apparatus of claim 2 wherein said gas volume measuring means comprises:
    a gas meter for recording cumulative gas volume consumption, said meter being mounted for easy outside access, and
    wherein there is one counter means.

4. The apparatus of claim 1 wherein said gas volume measuring means comprises means responsive to a predetermined measured unit of volumetric gas flow for providing said actuating signal, and
    said recording means comprise means responsive to said temperature measuring means output signal and each said actuating signal for incrementing a counter means a selected number of times, said number depending upon said temperature means output signal.

5. A gas consumption measuring apparatus for measuring the consumption of gas supplied by a utility comprising:
    an ambient outside temperature condition measuring means providing a first measurement signal,
    a volume measuring means for providing an electrical pulse signal in response to each successive measurement of a selected volume of gas,
    a plurality of remote counters, each counter, in response to said measured signals being adapted for incrementing its count, and
    counter selection and control means connected to said ambient temperature measuring means and volume measuring means for selectively directing each said incremental measured signal from said volume measuring means to a selected one of said counters, said one counter being selectively chosen in response to the temperature measuring means for measuring gas consumption in a preselected ambient temperature range.

6. A method of measuring and recording gas consumption comprising:
    measuring the ambient outside temperature to produce a first output signal depending on the measured ambient outside temperature,
    measuring the gas volume to produce a second discrete gas volume signal; and
    recording said first temperature signal and said second gas volume signal, said recording selectively responding to said gas volume measuring according to at least a first lower ambient temperature and a second higher ambient temperature thereby allowing a differential rate structure dependent on said ambient outside temperature to discourage the consumption of a greater volume of gas usage at low ambient temperature.

7. The method of claim 6 wherein said measuring and recording steps comprise the steps of:
    generating an electrical pulse signal corresponding to each use of a measured volume of gas,
    measuring and obtaining said first signal for measurement of the ambient outside air temperature, and
    directing said pulse signal to one of a plurality of counting elements, the selected counting element being dependent upon the signal representing said measured ambient temperature.

8. The method of claim 6 wherein said measuring and recording steps comprise the steps of
generating an electrical pulse signal corresponding to each use of a measured volume of gas,
measuring and obtaining said first signal for measurement of the ambient outside air temperature,
selectively directing said pulse signal to a counting element depending upon the signal representing said measured ambient temperature, and cumulating the total gas usage.

9. The method of claim 6 wherein said measuring and recording steps comprise the steps of:
generating an electrical pulse signal corresponding to each use of a measured volume of gas,
measuring and obtaining said first signal for measurement of the ambient outside air temperature, and
incrementing a counting element, in response to said pulse signal, a number of times corresponding to the signal representing said measured ambient temperature.

10. The method of claim 6 wherein said measuring and recording steps comprise the steps of:
generating an actuating electrical signal corresponding to each use of a measured volume of gas,
measuring and obtaining said first signal for measurement of the ambient outside air temperature, and
remotely generating an equivalent meter use value for characterizing gas flow volume through said line in response to said actuating signals and said measured temperature signal.

* * * * *